United States Patent [19]

Miyajima

[11] Patent Number: 5,298,006
[45] Date of Patent: Mar. 29, 1994

[54] MACHINING METHOD OF PUNCH PRESS MACHINE

[75] Inventor: Keiichiro Miyajima, Minamitsuru, Japan

[73] Assignee: Fanuc Ltd., Minamitsuru, Japan

[21] Appl. No.: 50,335

[22] PCT Filed: Sep. 30, 1992

[86] PCT No.: PCT/JP92/01262
§ 371 Date: May 13, 1993
§ 102(e) Date: May 13, 1993

[87] PCT Pub. No.: WO93/07546
PCT Pub. Date: Apr. 15, 1993

[30] Foreign Application Priority Data
Oct. 3, 1991 [JP] Japan .................. 3-256365

[51] Int. Cl.⁵ .............. B23Q 3/155; G05B 19/18; B21D 31/00
[52] U.S. Cl. ................................ 483/1; 83/39; 83/55; 364/474.21
[58] Field of Search ............ 483/1, 28, 29, 5, 6; 364/474.21, 474.34; 83/55, 50, 30, 39, 40, 76.6; 72/362; 408/1 R

[56] References Cited

U.S. PATENT DOCUMENTS

| | | | |
|---|---|---|---|
| 3,448,645 | 6/1969 | Graf et al. | 83/76.6 |
| 4,667,294 | 5/1987 | Shima et al. | 364/474.21 |
| 4,823,255 | 4/1989 | Tanaka et al. | 364/474.21 X |
| 4,965,737 | 10/1990 | Iwagaya | 364/474.22 |
| 5,041,985 | 8/1991 | Fujita | 483/1 X |
| 5,150,303 | 9/1992 | Fukaya et al. | 364/474.21 X |

FOREIGN PATENT DOCUMENTS

| | | | |
|---|---|---|---|
| 135161 | 7/1985 | Japan | 364/474.21 |
| 61-150010 | 7/1986 | Japan . | |
| 63-32608 | 2/1988 | Japan . | |
| 63-52207 | 3/1988 | Japan . | |
| 276608 | 11/1988 | Japan | 364/474.21 |
| 8901194 | of 0000 | World Int. Prop. O. | 483/1 |

*Primary Examiner*—William Briggs
*Attorney, Agent, or Firm*—Staas & Halsey

[57] ABSTRACT

Disclosed is a machining method of a punch press machine by which a moving time of a workpiece table is excluded in a punch press machining to improve an operation efficiency. When the punch press machine is commanded to execute a machining for punching a multiplicity of products, a custom macro stored in the memory of a numerical control apparatus is read out (S3), if a tool change is commanded (S4), a tool is changed without moving the workpiece table on which a raw material sheet is fixed (S5) and a machining sequence is reversed (S6), an actual machining is executed by a tool in a forward or reverse machining sequence (S7), unless a custom macro is finished a next machining command is executed (S8), and a next custom macro is executed unless all the machinings are finished (S9), and thus a wasteful waiting time arisen when a tool is changed is excluded, whereby an operation efficiency can be improved.

2 Claims, 4 Drawing Sheets

MACHINING METHOD OF PUNCH PRESS MACHINE

DESCRIPTION

1. Background Art

In a general punch press machining, a plurality of punching tools are alternately used to expand the machining conditions of a punch press machine. Further, a plurality of products having the same punching configuration are made from a single piece of a raw material sheet at the same time to increase the machining efficiency of the punch press machine. In particular, when the size of a product is small relative to the size of a raw material sheet, the number of products punched from a single piece of the raw material sheet is increased to effectively use the sheet. Therefore, in a process for punching respective products, a time necessary to move a punching tool to punching positions is increased and thus a time necessary to finish the punching process is also increased.

Conventionally, the movement of a workpiece table is controlled by a numerical control apparatus to reduce the moving time thereof. More specifically, a machining program is created to machine a single piece of a raw material sheet and stored in the memory of the numerical control apparatus. When the numerical control machine commands a punch press machine to punch a plurality of products, the punch press machine accesses the machining program stored in the memory commanded times. At this time, machining positions on a piece of the raw material sheet are located in a grid-shape to effectively punch a multiplicity of products.

The machining program commands a machining sequence and the like to a tool. Then, a machining command for driving a punching head in accordance with a commanded machining sequence is applied to the punch press machine. With this arrangement, a workpiece table on which the raw material sheet is fixed is sequentially moved so that a predetermined punch press machining is executed to the raw material sheet.

This machining program executes a punch press machining by two kinds of methods: in one of the methods, a punch press machining is executed while changing a tool for each product and this tool change is repeated for the predetermined number of products; and in the other of the methods, a multiplicity of products are machined by a single tool, and in this method, a punch press machining is executed predetermined times while changing a tool.

In general, the number of tool changes of the latter method is less than that of the former method and thus a time necessary to change all the tools and an entire machining time in the later method are shorter than those in the former method. Therefore, a punch press machine employs the latter machining method.

Nevertheless, a conventional machining method of the punch press machine executed by a machining program starts a machining operation from a fixed position. As a result, when a tool is to be changed, a time is needed to move a workpiece table from a position where previous machining is finished to a position from which a next machining is started, and thus a problem arises in that a time for waiting the start of the next machining is wasteful.

DISCLOSURE OF THE INVENTION

Taking the above into consideration, an object of the present invention is to provide a machining method of a punch press machine by which a moving time of a workpiece table is excluded to improve an operation efficiency.

To attain the above object, according to the present invention, there is provided a machining method of a punch press machine for making a plurality of products from a single piece of a raw material sheet, comprising the steps of fixing a tool and punching the raw material sheet at grid positions in a particular sequence, executing a tool change when a machining by the tool has been finished, and executing a machining in a sequence opposite to the sequence.

A machining program for machining a single piece of a raw material sheet is stored in the memory of a numerical control machine. When a punch press machine is commanded to punch a multiplicity of products, the raw material sheet is punched at grid positions by a punching tool in accordance with a particular machining sequence. When a tool change is effected to execute a next machining by using a next punching tool, a workpiece table is not moved from the position where the previous machining has been finished to the position where a next machining is started and the next machining is executed in the particular machining sequence opposite to that executed by the previous punching tool.

BEST MODE OF CARRYING OUT THE INVENTION

An embodiment of the present invention will be described below with reference to the drawings.

Figure 2:
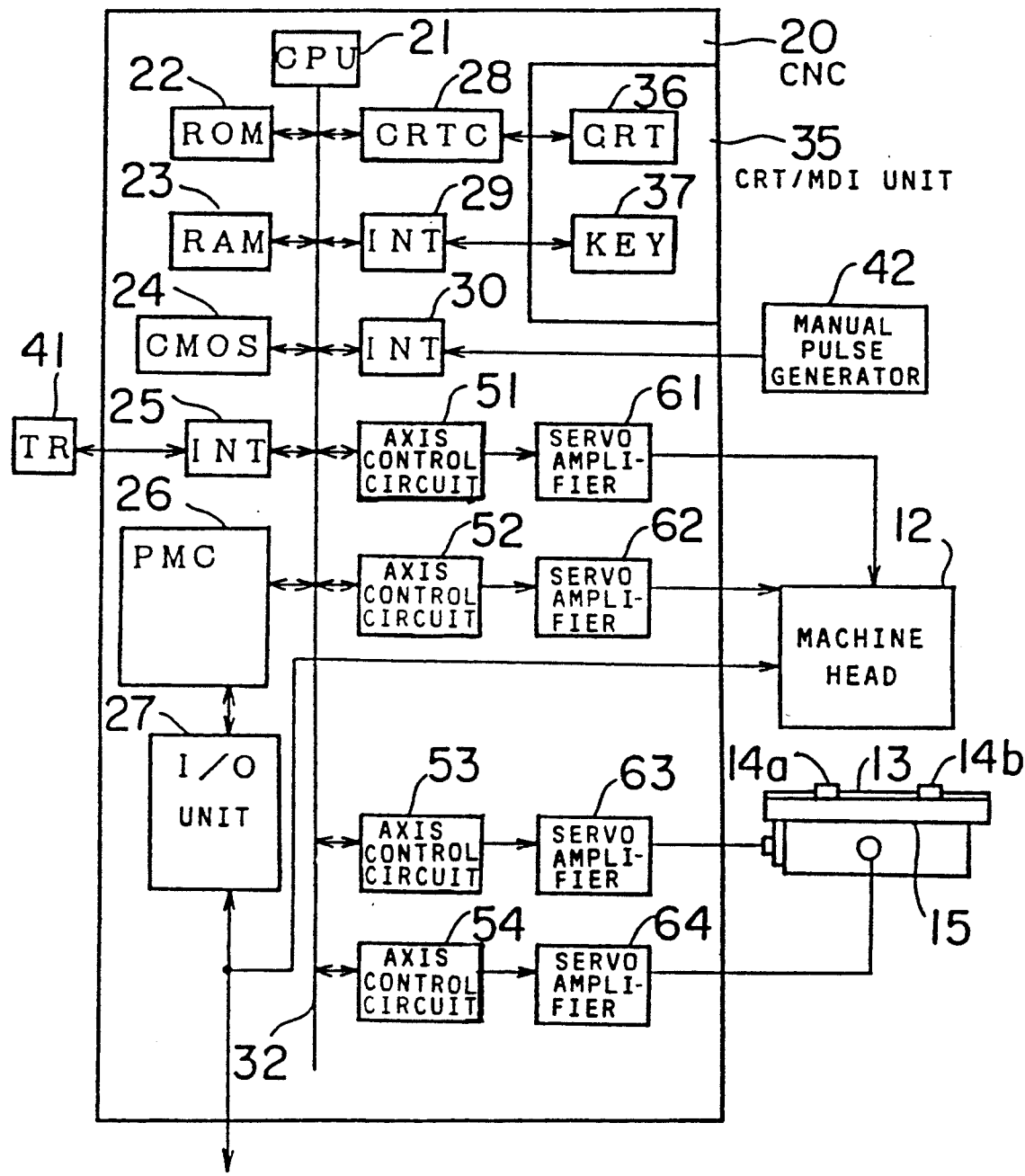
FIG. 2 is a block diagram of the hardware of a numerical control machine embodying the present invention.

FIG. 2 is a block diagram of the hardware of a numerical control apparatus embodying the present invention, wherein a processor 21 controls the numerical control apparatus 20 as a whole. That is, the processor 21 reads out a system program stored in a ROM 22, through a bus 32, and controls the entire numerical control apparatus 20 in accordance with the system program. An SRAM is used as a RAM 23 which stores temporary calculation data, display data and the like.

A CMOS 24 stores a machining program 100 in a pattern form (FIG. 3), custom macros, various parameters, amounts of tool correction, and the like. Further, the CMOS 24 is supplied with power from a not shown battery and thus data stored therein is maintained even if a power supply to the numerical control apparatus 20 is cut off.

An interface 25 for external units is connected to an external unit 41 such as a paper tape reader/puncher, floppy disk unit, or the like, and a machining program is read from the paper tape reader and executed. Further, a machining program edited in the numerical control apparatus 20 can be output to the paper tape puncher. These I/O controls are also executed to the external units such as the floppy disk unit and the like in the same way.

A programmable machine controller (PMC) 26 is incorporated in the numerical control apparatus 20 and controls the operation of a machine based on a sequence program created by a ladder form. More specifically, the PMC converts the commands of an M function, S function, T function and the like of a machining program into signals needed by the machine in accordance with the sequence program and outputs the same through an I/O unit 27 to the machine. These output signals drive magnets and the like of the machine to actuate hydraulic valves, pneumatic valves, electric actuators, punching heads and the like. Further, the PMC receives signals from the limit switches of the machine and from the switches of a machine control panel, and the like, processes them as necessary, and transfers the same to the processor 21.

A graphic control circuit 28 converts various kinds of digital data such as the present position of each axis, an alarm, parameters, and the like into image signals and outputs the same to the display unit 36 of a CRT/MDI unit 35, to be displayed thereon. An interface 29 receives input data such as a product number and the like from the keyboard 37 of the CRT/MDI unit 35 and supplies the same to the processor 21.

An interface 30 is connected to a manual pulse generator 42 and receives pulses therefrom. The manual pulse generator 42 is mounted to the machine control panel and used to precisely position movable machine units.

Axis control circuits 51-54 receive commands for moving respective axes from the processor 21 and output commands for the respective axes to servo amplifiers 61-64. The servo amplifier 61 drives a T-axis servo motor for controlling the rotation of a magazine. Note, a machining head 12 includes the magazine, punching head, and the like.

The servo amplifier 62 drives a C-axis for controlling the rotation of a tool. The servo amplifiers 63, 64 drive X- and Y-axis servo motors for controlling a workpiece table 15, respectively. The workpiece table 15 has a raw material sheet 13 fixed thereon by workpiece holders 14a, 14b.

A machining method of the punch press machine provided with the numerical control apparatus 20 will be described below in detail.

Figure 3:
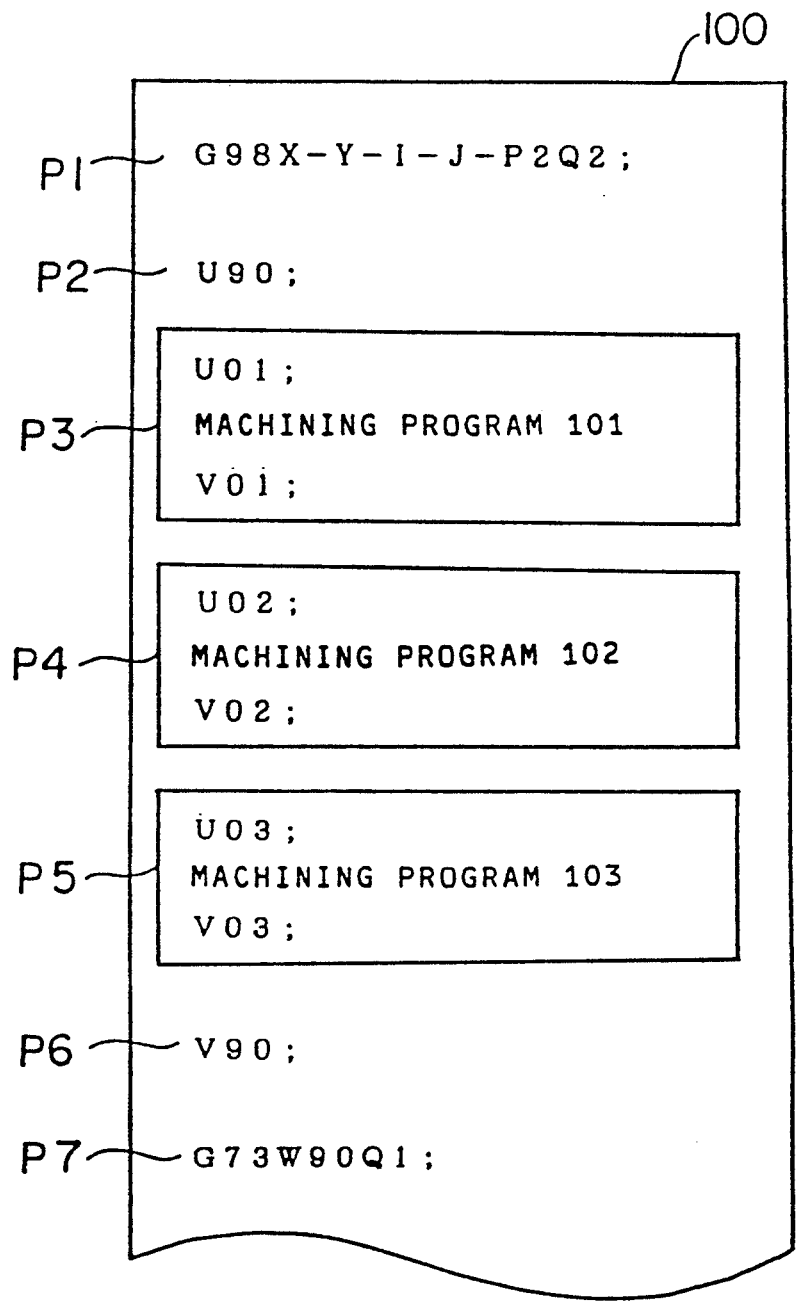
FIG. 3 is a diagram explaining an example of a machining program for making a multiplicity of products.

FIG. 3 is a diagram explaining an example of the machining program for making a multiplicity of products. In FIG. 3, the machining program is roughly divided into machining commands P1-P7. The machining command P1 is used to set a local coordinate system for making the multiplicity of products. Parameters "X" and "Y" following to G98 as a G function of an NC command represent a reference coordinate. Further, parameters "I" and "J" represent the lengths of a single product in the X- and Y-axis directions, respectively. Further, parameters "P" and "Q" (P2Q2) represent the number of the products in the X- and Y-axis directions, respectively, and a machining position is moved horizontally (in the X-axis direction) twice and vertically (in the Y-axis direction) twice to execute the same machining operation nine times. A machining sequence at this time will be described below.

A machining command P2 is a custom macro (hereinafter, abbreviated as "macro") start command. This macro command begins by "U" and ends by "V". At this time, the same numeral must follow to "U" and "V". Therefore, since a machining command P2 is "U90", "V90" of a machining command P6 is a macro end command. That is, from a command next to the machining command P2 to a command prior to the machining command P6 (i.e., machining commands P3-P5 in FIG. 3) are stored as a macro. A machining corresponding to a series of the commands in the macro can be executed by a tool.

The machining commands P3-P5 are commands for storing machining programs 101-103 as the macro. In the machining programs 101-103, a machining configuration is commanded by a different NC command for the punch press machining of a single product.

A machining command P7 is a command for executing a punch press machining. Note, G73 as a G function of the NC command is a command for starting the punching of a multiplicity of products in the horizontal direction (in the X direction), and G74 is a command for starting the punching of a multiplicity of products in the vertical direction (in the Y direction)

A parameter "W" following to G73 represents a macro execution command. That is, a macro from "U" to "V" each having the same numerical following to "W" is executed. In this case, since "W90" is employed, the macro from "U90" to "V90" is executed. Further, a parameter "Q" represents a machining start position. A numeral following to "Q" represents each of the four corners of a raw material sheet by a number, and a position where a first machining is started is represented by 1 and a position where the first machining is ended is represented by 4.

Therefore, in the example shown in FIG. 3, an actual machining is repeatedly executed nine times in response to the machining command P7 in the sequence of the machining programs 101, 102 and 103 stored as the macro. At this time, a machining start position is alternately changed as follows each time a tool is changed. Q1-Q4-Q1-Q4-Q1-... Further, when a tool is changed, the workpiece table on which the raw material sheet is fixed is not moved. As a result, a wasteful waiting time needed before a next machining actually is started after the tool has been changed and then the workpiece table has been moved can be excluded.

Figure 4:
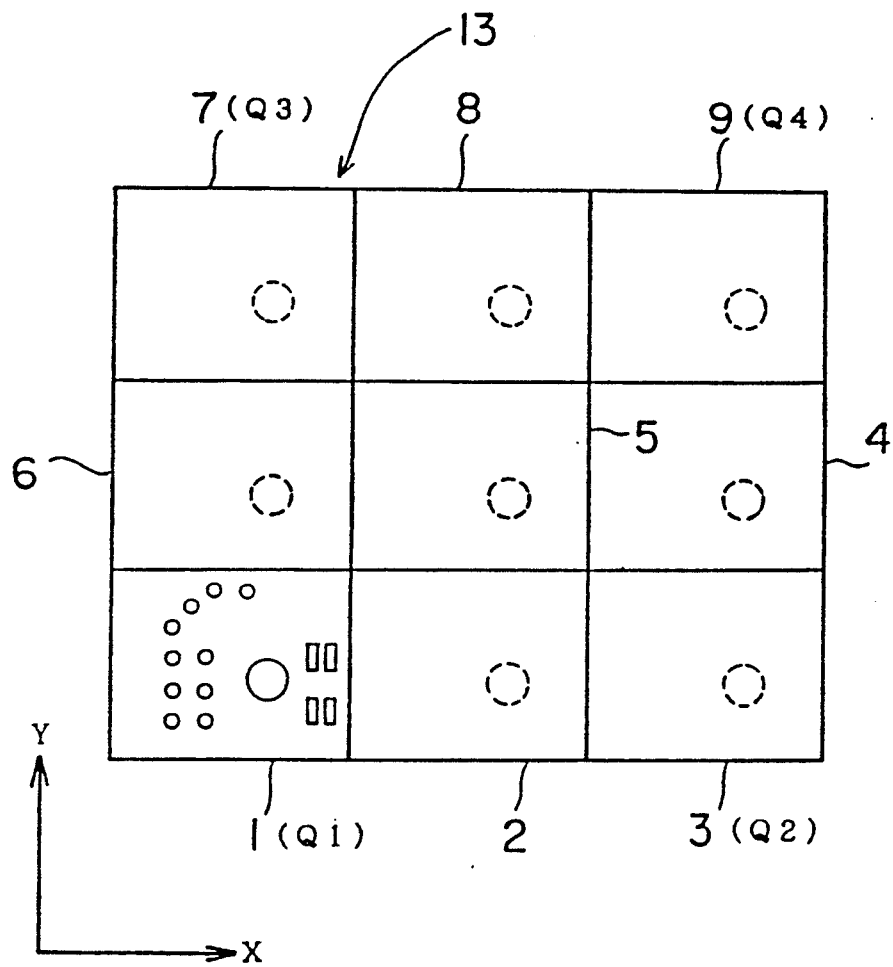
FIG. 4 is a diagram showing an example for machining a single piece of a raw material sheet.

FIG. 4 is a diagram showing a machining example of a single piece of a raw material sheet, wherein products 1 to 9 are disposed in a grid-shape. These products are arranged on a raw material sheet 13. A punch press machining executed by the machining program 100 shown in FIG. 3 will be describe below.

At first, an initial machining is executed by a tool in the sequence of product 1-product 2-product 3—product 4-.... product 8-product 9, and then a tool change is executed. At this time, the workpiece table on which the raw material sheet 13 is fixed is not moved. Further, after the tool change, a next machining is executed in the sequence opposite to the above initial sequence, i.e. in the sequence of product9-product 8—product 7-product 6-.... product 2-product 1. Then, a tool change is executed again. The workpiece table on which the raw material sheet 13 is fixed is not moved also at this time. After the tool change, a machining is executed in the same sequence as that of the initial machining. Thereafter, these machining sequences are repeated predetermined times in the same way.

Although the machining start position parameter "Q" is 1 in the machining program 100 shown in FIG. 3, the machining can be executed even if the machining start position parameter "Q" is 2, 3 or 4. For example, when the machining start position parameter "Q" is 2, an initial machining is executed in the sequence of product 3-product 2-product 1-product 6-....product 8-product 7 and then a tool change is executed. After the tool change, the next machining is executed in the sequence opposite to the sequence of the initial machining, i.e. in the sequence of product 7-product 8-product 9-product 4-....product 2-product 3. Thereafter, these machining sequences are repeated predetermined times in the same way.

Figure 1:
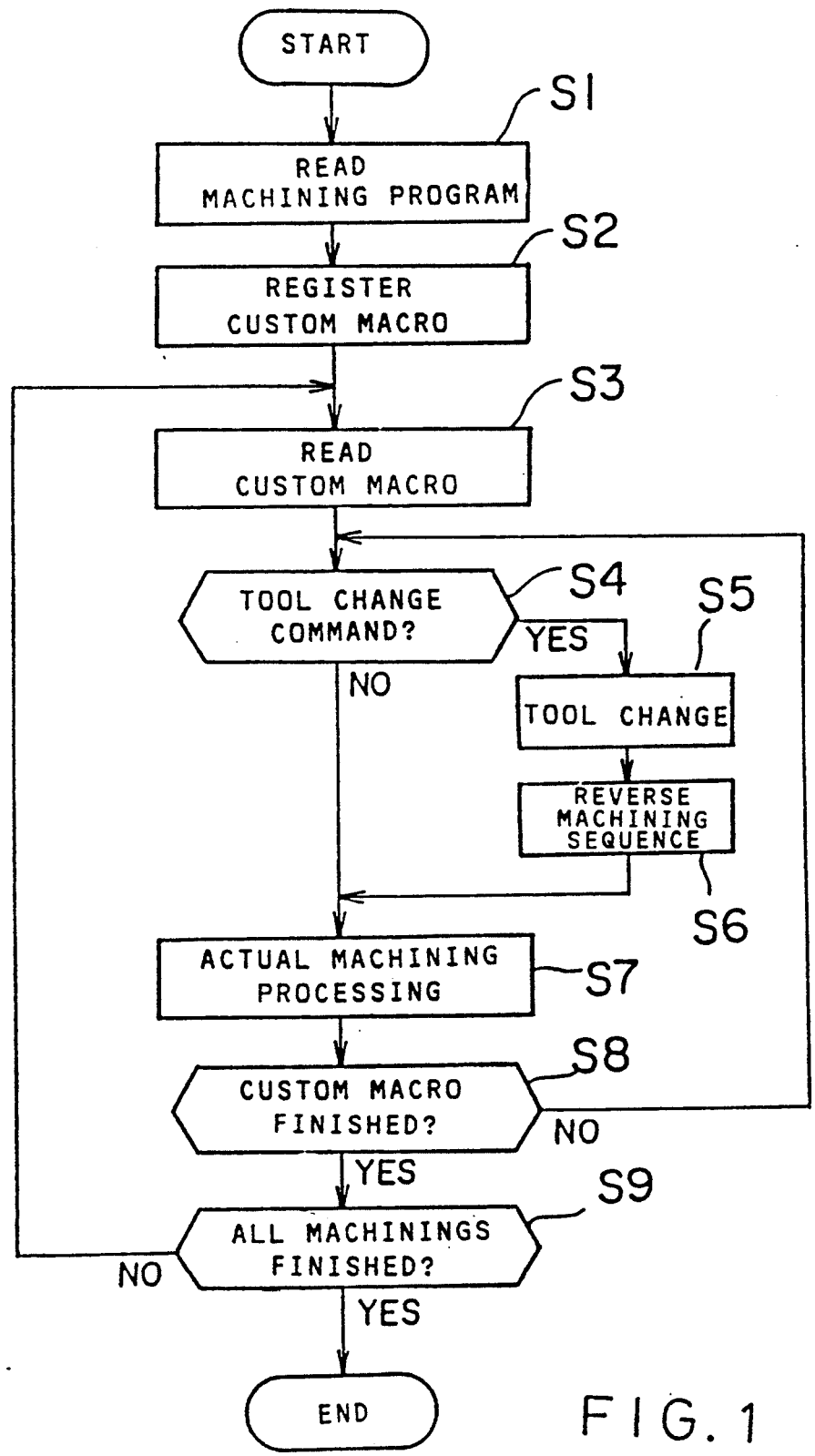
FIG. 1 is a flowchart showing an example of a machining method of a punch press machine according to the present invention.

FIG. 1 is a flowchart showing an example of the machining method of the punch press machine according to the present invention, wherein numerals prefixed with an "S" indicate the numbers of steps of the process. Note, steps S1 and S2 represent pocessings before a command for executing a press punch machining of a multiplicity of products and steps S3-S9 represent pocessings after the command for executing the press punch machining of the multiplicity of products.

[S1] A machining program is read in. For example, all the programs shown in FIG. 3 (machining commands P1-P7) are read in.

[S2] A macro is registered (stored). In the example of FIG. 3, the commands between the U90 including the machining programs 101, 102 and 103 (machining command P2) and the V90 (machining command P6) are registered (stored) as the macro to make a preparation for the execution of a machining command for the multiplicity of products.

[S3] The macro is read in and further converted into internal commands for executing an actual machining.

[S4] It is determined whether a next command is a tool change command (T function of the NC command) or not, and if it is the tool change command (YES), the process goes to step S5, and if it is a command other than the tool change command (NO), the process goes to step S7.

[S5] A tool change is executed for a next machining. At this time, the workpiece table 15 shown in FIG. 2 on which the raw material sheet is fixed is not moved.

[S6] A machining sequence is reversed. That is, the machining sequence is reversed to a forward direction or an opposite direction. For example, when the machining is executed in the forward direction before the tool change, a next machining is executed in the opposite direction.

[S7] A punch press machining is actually executed in accordance with a particular machining sequence. After the machining, the workpiece table 15 is moved to a next machining position.

[S8] It is determined whether the macro has been finished or not. That is, it is determined whether the machining commands in a single macro have been finished or not. If the machining commands have been finished (YES), the process goes to step S9, and if they still remain (NO), the process returns to step S4.

[S9] It is determined whether all the machinings have been finished or not. That is, it is determined if there remain macros to be executed or not. If there remain macros to be executed (YES), the process returns to step S3, and if there remains no macro to be executed (NO), this machining process is finished.

In the above description, although "G98" as a G function of the NC command is assigned to the command for setting the local coordinate system for making a multiplicity of products as well as "G73" and "G74" as a G function of the NC command are assigned to the command for starting the punching of the multiplicity of products, other G function, M functions and the like of the NC command may be assigned to them. In the same way, G98, G73 and G74 may be commanded to the comment sentence of a machining program as parameters.

Further, the direction in which the punching of the multiplicity of products is started is designated by G73 and G74 as a G function of the NC command. Since, however, the length of a single product is known from the parameters "I" and "J" of G98, the direction with a shorter moving distance may be automatically determined as the punching start direction regardless of the designation made by G73 and G74.

Further, although a machining program for a single tool is stored as a custom macro and the stored machining program is executed in response to a command for executing the custom macro, a machining program corresponding to the number of products to be punched may be initially expanded and stored and then sequentially executed.

Further, although sequential numbers from 1 are set at the four corners of a raw material sheet in accordance with an initial machining sequence to indicate a machining start position, these numbers may be set in accordance with other NC commands, parameters or the like.

As described above, according to the present invention, a machining program for machining a single piece of a raw material sheet is stored in the memory of a numerical control apparatus, when a punch press machine is commanded to punch a multiplicity of products, the raw material sheet is punched at grid positions by a punching tool in accordance with a particular machining sequence, when a tool change is effected to execute a next machining by using a next punching tool, a workpiece table is not moved from the position where the previous machining has been finished to the position where a next machining is started and the next machining is executed in particular machining sequence opposite to that executed by the previous punching tool, and thus a moving time of the workpiece table can be excluded. Further, a machining time is reduced to improve an operation efficiency.

I claim:

1. A machining method of a punch press machine for punching a plurality of products from a single piece of a raw material sheet, comprising the steps of:
    fixing a tool and punching said raw material sheet at grid positions in a particular sequence;
    executing a tool change when a machining by said tool has been finished; and
    executing a machining in a sequence opposite to said sequence.

2. A machining method of a punch press machine according to claim 1, wherein a machining by a tool is commanded by a custom macro.

* * * * *